United States Patent
Backholm et al.

(10) Patent No.: US 7,706,781 B2
(45) Date of Patent: Apr. 27, 2010

(54) DATA SECURITY IN A MOBILE E-MAIL SERVICE

(75) Inventors: Ari Backholm, Espoo (FI); Jukka Ahonen, Espoo (FI); Marcus Groeber, Gifhorn (DE); Seppo Salorinne, Helsinki (FI); Lauri Vuornos, Helsinki (FI); Antti Saarlilahti, Helsinki (FI); Marko Ketonen, Helsinki (FI); Petri Salmi, Espoo (FI)

(73) Assignee: Seven Networks International OY, Helsinki (FI)

( * ) Notice: Subject to any disclaimer, the term of this patent is extended or adjusted under 35 U.S.C. 154(b) by 688 days.

(21) Appl. No.: 11/282,607

(22) Filed: Nov. 21, 2005

(65) Prior Publication Data

US 2006/0240804 A1 Oct. 26, 2006

Related U.S. Application Data

(60) Provisional application No. 60/650,975, filed on Feb. 9, 2005, provisional application No. 60/651,082, filed on Feb. 9, 2005.

(30) Foreign Application Priority Data

Nov. 22, 2004 (FI) .................................. 20045451
Jan. 26, 2005 (FI) .................................. 20055038

(51) Int. Cl.
*H04M 11/10* (2006.01)
(52) U.S. Cl. .................. 455/413; 455/412.1; 455/414.1; 455/414.4
(58) Field of Classification Search .............. 455/412.1, 455/412.2, 413, 414.1, 414.4
See application file for complete search history.

(56) References Cited

U.S. PATENT DOCUMENTS 4,831,582 A 5/1989 Miller et al.

(Continued)

FOREIGN PATENT DOCUMENTS

EP 0 772 327 A2 5/1997

(Continued)

OTHER PUBLICATIONS

Lotus Development Corporation, Lotus Quick Reference for SmartIcons, Lotus Notes Release 3.1.

(Continued)

*Primary Examiner*—Ajit Patel
*Assistant Examiner*—Khai M Nguyen
(74) *Attorney, Agent, or Firm*—Carr & Ferrell LLP

(57) ABSTRACT

A method for conveying e-mail traffic between an e-mail server (108) and a mobile terminal (102) which has an e-mail address (122A) under the e-mail server and permanent terminal identity (122B) and a temporary identity (122D) in an access network (114). A connectivity function (600) is operationally coupled to the e-mail server (108) and the access network (114). The connectivity function (120) encrypts e-mail traffic to the mobile terminal and decrypt e-mail traffic from the mobile terminal, by using encryption information (122C). The mobile terminal generates (2-1) a service activation code which comprises an identifier (124D) of the mobile terminal, encryption information (122C) and checksum information. The service activation code is conveyed (2-3, 2-4) via a secure channel (2-3) to an authenticating terminal (100), from which the identifier (124D) of the mobile terminal and the encryption information (122C) are conveyed to the connectivity function (600).

10 Claims, 1 Drawing Sheet

U.S. PATENT DOCUMENTS

| | | |
|---|---|---|
| 4,875,159 A | 10/1989 | Cary et al. |
| 4,897,781 A | 1/1990 | Chang et al. |
| 5,263,157 A | 11/1993 | Janis |
| 5,386,564 A | 1/1995 | Shearer et al. |
| 5,392,390 A | 2/1995 | Crozier |
| 5,572,643 A | 11/1996 | Judson |
| 5,581,749 A | 12/1996 | Hossain et al. |
| 5,600,834 A | 2/1997 | Howard |
| 5,613,012 A | 3/1997 | Hoffman et al. |
| 5,623,601 A | 4/1997 | Vu |
| 5,627,658 A | 5/1997 | Connors et al. |
| 5,630,081 A | 5/1997 | Rybicki et al. |
| 5,634,053 A | 5/1997 | Noble et al. |
| 5,647,002 A | 7/1997 | Brunson |
| 5,652,884 A | 7/1997 | Palevich |
| 5,666,553 A | 9/1997 | Crozier |
| 5,680,542 A | 10/1997 | Mulchandani et al. |
| 5,682,524 A | 10/1997 | Freund et al. |
| 5,684,990 A | 11/1997 | Boothby |
| 5,701,423 A | 12/1997 | Crozier |
| 5,704,029 A | 12/1997 | Wright, Jr. |
| 5,706,502 A | 1/1998 | Foley et al. |
| 5,710,918 A | 1/1998 | Lagarde et al. |
| 5,713,019 A | 1/1998 | Keaten |
| 5,715,403 A | 2/1998 | Stefik |
| 5,717,925 A | 2/1998 | Harper |
| 5,721,908 A | 2/1998 | Lagarde et al. |
| 5,721,914 A | 2/1998 | DeVries |
| 5,727,202 A | 3/1998 | Kucala |
| 5,729,735 A | 3/1998 | Meyering |
| 5,745,360 A | 4/1998 | Leone et al. |
| 5,752,246 A | 5/1998 | Rogers et al. |
| 5,757,916 A | 5/1998 | MacDoran et al. |
| 5,758,150 A | 5/1998 | Bell et al. |
| 5,758,354 A | 5/1998 | Huang et al. |
| 5,758,355 A | 5/1998 | Buchanan |
| 5,765,171 A | 6/1998 | Gehani et al. |
| 5,778,346 A | 7/1998 | Frid-Neilsen et al. |
| 5,787,441 A | 7/1998 | Beckhardt |
| 5,790,425 A | 8/1998 | Wagle |
| 5,790,790 A | 8/1998 | Smith et al. |
| 5,799,318 A | 8/1998 | Cardinal et al. |
| 5,832,483 A | 11/1998 | Barker |
| 5,857,201 A | 1/1999 | Wright, Jr. et al. |
| 5,870,759 A | 2/1999 | Bauer et al. |
| 5,909,689 A | 6/1999 | Van Ryzin |
| 5,943,676 A | 8/1999 | Boothby |
| 5,968,131 A | 10/1999 | Mendez et al. |
| 6,006,274 A | 12/1999 | Hawkins et al. |
| 6,023,708 A | 2/2000 | Mendez et al. |
| 6,044,381 A | 3/2000 | Mendez et al. |
| 6,085,192 A | 7/2000 | Mendez et al. |
| 6,131,096 A | 10/2000 | Ng et al. |
| 6,131,116 A | 10/2000 | Riggins et al. |
| 6,138,124 A | 10/2000 | Beckhardt |
| 6,141,664 A | 10/2000 | Boothby |
| 6,151,606 A | 11/2000 | Mendez |
| 6,212,529 B1 | 4/2001 | Boothby et al. |
| 6,219,694 B1 | 4/2001 | Lazaridis et al. |
| 6,223,187 B1 | 4/2001 | Boothby et al. |
| 6,233,341 B1 | 5/2001 | Riggins |
| 6,324,542 B1 | 11/2001 | Wright, Jr. et al. |
| 6,708,221 B1 | 3/2004 | Mendez et al. |
| 6,732,101 B1 | 5/2004 | Cook |
| 6,745,326 B1 | 6/2004 | Wary |
| 6,799,190 B1 | 9/2004 | Boothby |
| 2002/0019225 A1 | 2/2002 | Miyashita |
| 2004/0205330 A1 | 10/2004 | Godfrey et al. |
| 2006/0265595 A1* | 11/2006 | Scottodiluzio ............. 713/180 |

FOREIGN PATENT DOCUMENTS

| | | |
|---|---|---|
| WO | WO 98/24257 | 6/1998 |
| WO | WO 03/007570 | 1/2003 |
| WO | WO 03/098890 | 11/2003 |
| WO | WO 03/098890 A1 | 11/2003 |
| WO | WO 2004-045171 A1 | 5/2004 |

OTHER PUBLICATIONS

Lotus Development Corporation, Lotus Quick Reference for Windows and Presentation Manager, Lotus Notes Release 3.

Lotus Development Corporation, Lotus Quick Reference for Macintosh, Lotus Notes Release 3.0.

Lotus Development Corporation, Lotus Quick Reference for Application Developer's, Lotus Notes Release 3.

Lotus Development Corporation, Lotus Customer Support Service, Lotus Notes Customer Support Guides.

Lotus Software Agreement for "Notes 4.0 NA DKTP Client UPG", Part No. 38985.

Lotus Development Corporation, Lotus Notes 3.3, Lotus Customer Support, North American Guide, 29 pages.

Lotus Development Corporation, Lotus Notes 4.0, Lotus Customer Support, North American Guide, 29 pages.

Lotus Development Corporation, Lotus Notes 4.1 Starter Pack, Lotus Customer Support, North American Guide, 51pages.

Lotus Development Corporation, "Lotus Script Classes for Notes Release 4",6 pages.

Allchin, James E., "An Architecture for Reliable Decentralized Systems", UMI Dissertation Services, Copyright 1983.

Lotus Development Corporation, Lotus Notes Release 3.1. The Groupware Standard, Administrator's Guide—Server for NetWare, OS/2, and UNIX,1989.

Lotus Development Corporation, Lotus Notes Release 3.1: The Groupware Standard, Site and Systems Planning Guide, 1991.

Wilcox, Adam A., PC Learning Labs Teaches Lotus Notes 3.0: The Quick and Easy Way to Learn, Ziff-Davis Press, 1993.

Lotus Development Corporation, Lotus Notes Release 3.3: Start Here, Workstation Install for Windows, OS/2 and Macintosh, 1993.

Lotus Development Corporation, Lotus Notes Release 3.1: Administrator's Guide—Server for Windows, 1993.

Lotus Development Corporation, Lotus Notes Release 3.1: The Groupware Standard, Customer Services Application Guide, 1994.

Lotus Development Corporation, Lotus Notes Release 3.1: The Groupware Standard, Getting Started with Application Development, 1994.

Lotus Development Corporation, Lotus Notes Release 3.1: The Groupware Standard, Network Driver Documentation, 1994.

Komblith, Polly R., Lotus Notes Answers: Certified Tech Support, Covers Lotus Notes Release 3, Osborne McGraw-Hill, 1994.

Freeland, Pat and Londergan, Stephen, Lotus Notes 3/3.1 for Dummies TM, IDG Books Worldwide, 1994.

Gewirtz, David, Lotus Notes 3 Revealed! Your Guide to Managing Information and Improving Communication Throughout Your Organization, Prima Publishing, 1994.

Shafran, Andrew B., Easy Lotus Notes for Windows™, Que® Corporation,1994.

Lotus Development Corporation, Lotus Notes Release 3.3: The Groupware Standard, Administration, 1994.

McMullen, Melanie, Editor, Network Remote Access and Mobile Computing, Miller Freeman Inc., 1994.

Lotus Development Corporation, Lotus Notes: The Groupware Standard-Windows, 1994.

IntelliLink Corporation, IntelliLink® For Windows User's Guide, Version 3.0, 1994.

Lotus Development Corporation, Lotus Notes Release 4: InterNotes Web Navigator Administrator's Guide, 1995.

Lotus Development Corporation, Lotus InterNotes Release 4 Web Publisher: InterNotes Web Publisher Guide, 1995.

Lotus Development Corporation, Lotus Notes Release 4 Install Guide for Servers, 1995.

Lotus Development Corporation, Lotus Notes Release 4.1 Release Notes, 1995.
Lotus Development Corporation, Lotus Notes Release 4 Migration Guide, 1995.
Lotus Development Corporation, Lotus Notes Release 4 Database Manager's Guide, 1995.
Lotus Development Corporation, Lotus Notes Release 4 Install Guide for Workstations, 1995.
Lotus Development Corporation, Lotus Step by Step: A Beginner's Guide to Lotus Notes, 1995.
Lotus Development Corporation, Lotus Notes Release 4 Programmer's Guide Part 1, 1995.
Lotus Development Corporation, Lotus Notes Release 4 Programmer's Guide Part 2, 1995.
Lotus Development Corporation, Lotus Notes Release 4 Administrator's Guide, 1995.
Lotus Development Corporation, Lotus Notes Release 4 Deployment Guide, 1995.
Lotus Development Corporation, Lotus Notes Release 4 Application Developer's Guide, 1995.
Lotus Development Corporation, Lotus Notes Release 4 InterNotes Web Navigator User's Guide, 1995.
Lotus Development Corporation, Lotus Notes Release 4 Release Notes, 1995.
Lotus Development Corporation, Lotus Notes Release 4.5 Install Guide for Workstations, 1995.
Lotus Development Corporation, Release Notes, Lotus Notes Release 3.30, Windows, OS/2, and Macintosh, 1995.
Brown, Kevin, et al., Mastering Lotus® Notes®, Sybex Inc., 1995.
Lotus Development Corporation, Lotus Notes Release 4.5, Network Configuration Guide, 1995.
Netscape Communications Corporation, Installation Guide, Netscape Mail Server, Version 2.0 for Unix, 1995.
Netscape Communications Corporation, User's Guide, Netscape Mail Server, Version 2.0, 1995.
Netscape Communications Corporation, Administrator's Guide, Netscape Mail Server, Version 2.0, 1995.
Pyle, Hugh, "The Architecture of Lotus Notes", Lotus Notes Advisor, Advisor Publications, Premiere Issue 1995, pp. 18-27.
Lotus Notes Advisor, Advisor Publications, Jun. 1995, entire magazine.
IBM, "The Architecture of Lotus Notes", White Paper, No. 114654, modified date: May 31, 1995.
Lotus Development Corporation, Lotus Notes Knowledge Base, "What is the Notes Replicator", Jul. 5, 1995.
Lotus Notes Advisor, Advisor Publications, Aug. 1995, entire magazine.
Grous, Paul J., "Creating and Managing a Web Site with Lotus' InterNotes Web Publisher", The View Technical Journal for Lotus Notes® Software, vol. 1, Issue 4, Sep./Oct. 1995, pp. 3-18.
Lotus Notes Advisor, Advisor Publications, Oct. 1995, entire magazine.
Cole, Barb, "Lotus airs Notes-to-database integration tool", www.looksmart.com, Oct. 2, 1995.
Lotus Development Corporation, Lotus Notes Knowledge Base, "Lotus Announces Lotus NotesPump 1.0", Oct. 31, 1995.
Lotus Development Corporation, Lotus Notes Knowledge Base, "Lotus NotesPump 1.0 Q & A", Oct. 31, 1995.
Lotus Development Corporation, Lotus Notes Knowledge Base, "Lotus NotesPump: Database Integration for Lotus Notes", Oct. 31, 1995.
Lotus Development Corporation, Lotus Notes Knowledge Base, "How to Set Up "Firewall" Protection for a Notes Domain", Nov. 6, 1995.
Balaban, Bob, "This is Not Your Father's Basic: LotusScript in Notes Release 4", Lotus Notes Advisor, Advisor Publications, vol. 1, No. 5, Nov./Dec. 1995, pp. 31-58.
Pyle, Lisa, "A Jump Start to the Top Ten R3-to-R4 Migration Considerations", Lotus Notes Advisor, Advisor Publications, vol. 1, No. 5, Nov./Dec. 1995, pp. 3-20.
Lotus Notes Advisor, Advisor Publications, Dec. 1995, entire magazine.
Lotus Development Corporation, Lotus Notes Release 4 Install Guide for Workstations, First Revision, 1996.
Lotus Development Corporation, Lotus Step by Step: A Beginner's Guide to Lotus Notes, First Revision, 1996.
Freeland, Pat and Londergan, Stephen, Lotus Notes Release 4 for Dummies™, IDG Books Worldwide, 1996.
Kreisle, Bill, Teach yourself . . . Lotus Notes 4, MIS: Press, 1996.
Marmel, Elain, Easy Lotus® Notes Release 4.0, Que Corporation, 1996.
Lotus Development Corporation, Lotus Notes Server Up and Running!, Release 4, 1996.
Falkner, Mike, "How to Plan, Develop, and Implement Lotus Notes in Your Organization", Wiley Computer Publishing, John Wiley and Sons, Inc., 1996.
Lamb, John P., et al., "Lotus Notes Network Design", McGraw-Hill, 1996.
Tamura, Randall A., et al., Lotus Notes 4 Unleashed, Sams Publishing, 1996.
Dahl, Andrew, Lotus Notes 4 Administrator's Survival Guide, Sams Publishing, 1996.
Netscape Communications Corporation, Administrator's Guide, Netscape News Server, Version 2.0, 1996.
Lotus Development Corporation, Lotus Notes Internet Cookbook for Notes Release 3, Jan. 16, 1996.
Wong, Harry, "Casahl's Replic-Action: Delivering True Notes/DBMS Integration", The View Technical Journal for Lotus Notes® Software, vol. 2, Issue 1, Jan./Feb. 1996, pp. 33-50.
Lotus Notes Advisor, Advisor Publications, Jan./Feb. 1996, entire magazine.
IBM International Technical Support Organization, Lotus Notes Release 4 in a Multiplatform Environment, Feb. 1996.
Lotus Development Corporation, Lotus Notes Internet Cookbook for Notes Release 4, Feb. 14, 1996.
Blaney, Jeff, "You Can Take it with you: An Introduction to Mobile Computing with Notes R4", The View Technical Journal for Lotus Notes® Software, vol. 2, Issue 1, Jan./Feb. 1996, pp. 22-32.
Lotus Notes Advisor, Advisor Publications, Apr. 1996, entire magazine.
Frankel, Garry, "Pumping for Info: Notes and Database Integration", Network Computing, May 1, 1996, pp. 76-84.
Lotus Development Corporation, Lotus Notes Knowledge Base, "Firewall Security Overview and How Firewalls Relate to Lotus Notes", May 22, 1996.
Lotus Notes Advisor, Advisor Publications, Jun. 1996, entire magazine.
Augun, Audry, "Integrating Lotus Notes with Enterprise Data", Lotus Notes Advisor, Advisor Publications, Jul./Aug. 1996, pp. 22-25.
Lotus Notes Advisor, Advisor Publications, Aug. 1996, entire magazine.
IBM Corporation, Secrets to Running Lotus Notes: The Decisions No One Tells You How to Make, Oct. 1996.
Lotus Notes Advisor, Advisor Publications, Oct. 1996, entire magazine.
Opyt, Barbara, et al., "Use the Internet as Your Lotus Notes WAN", Lotus Notes Advisor, Advisor Publications, Nov./Dec. 1996, pp. 17-20.
Lotus Notes Advisor, Advisor Publications, Dec. 1996, entire magazine.
Swedeen, Bret, et al., "Under the Microscope: Domino Replication", LDD Today, Oct. 1, 1998.
Lotus Development Corporation, Lotus Inside Notes: The Architecture of Notes and the Domino Server, 2000.
"The History of Notes and Domino", Lotus Developer Domain, Lotus, Sep. 29, 2003.
Overview: What is Lotus Notes Pump?
NotesPump 1.0 Release Notes.
Lotus Notes—Notes Administration Help screen shot.
Chapter 13-1, publication unknown, "Anatomy of a Note ID".
Chapter: About NotesPump.

* cited by examiner

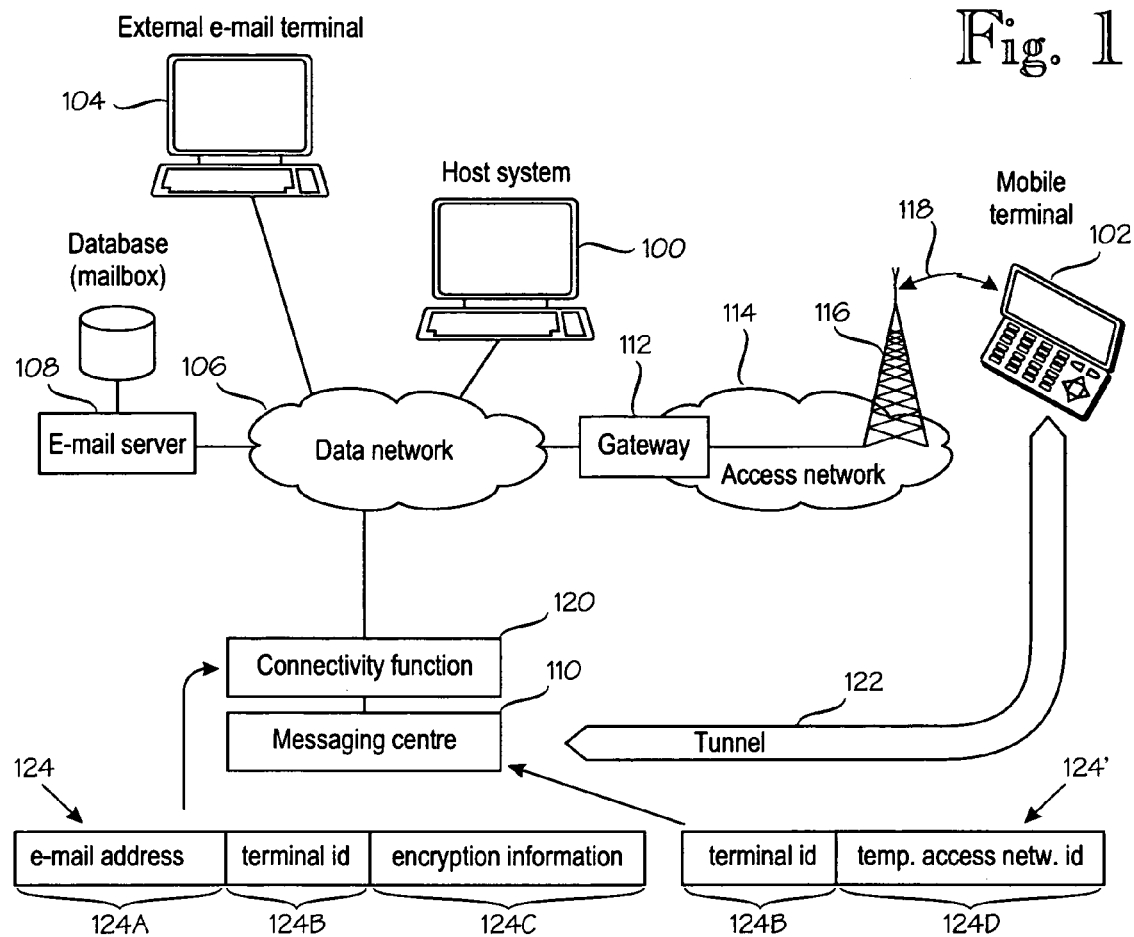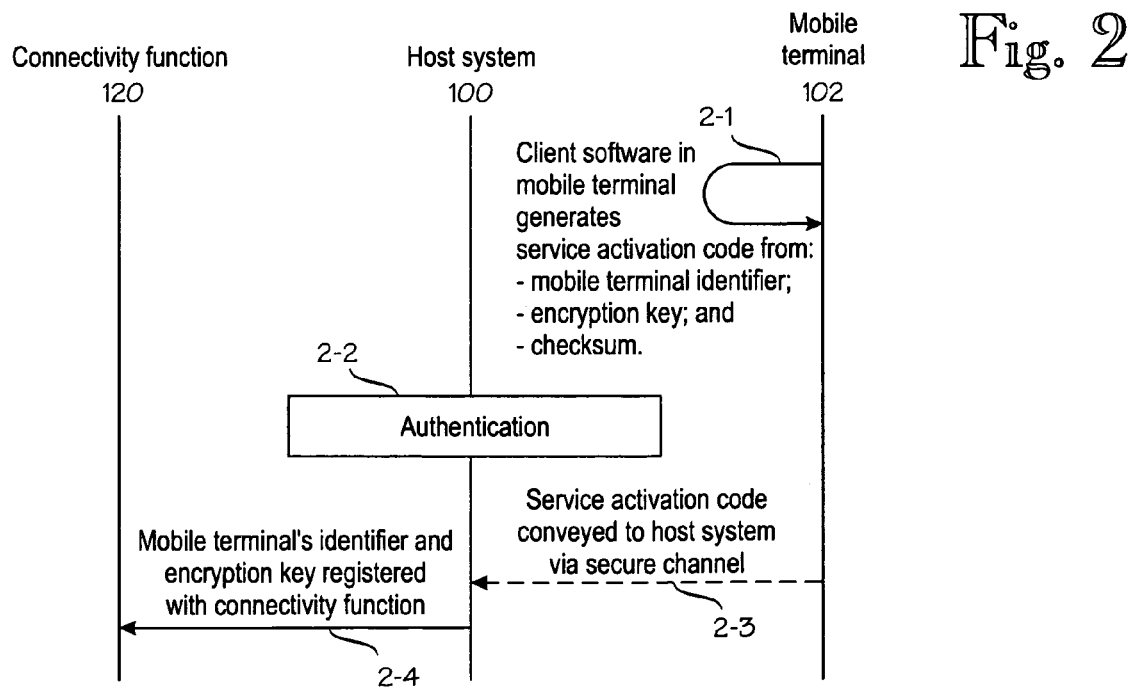

DATA SECURITY IN A MOBILE E-MAIL SERVICE

CROSS-REFERENCE TO RELATED APPLICATIONS

This application relies for priority upon Finnish Application No. 20045451, filed Nov. 22, 2004, and Finnish Application No. 20055038, filed Jan. 26, 2005, as well as U.S. Provisional Application Nos. 60/650,975 and 60/151,082, both filed Feb. 9, 2005, the contents of all of which are incorporated herein by reference in their entireties.

BACKGROUND OF THE INVENTION

The invention relates to methods and equipment for establishing data security in an e-mail service between an e-mail server and a mobile terminal.

Data security in an e-mail service is achieved by using cryptographic techniques in which traffic in a potentially insecure channel is encrypted using cryptographic information, commonly called encryption keys. A problem underlying the invention relates to distributing such encryption information. Prior art techniques for distributing the encryption information are commonly based on public key encryption techniques, such as Diffie-Hellman. A problem with this approach is that the parties have to trust the underlying mobile network and its operator, which they are surprisingly reluctant to do. Another problem is that mobile terminals tend to have small and restricted user interfaces.

BRIEF DESCRIPTION OF THE INVENTION

An object of the present invention is to provide a method and an apparatus for implementing the method so as to alleviate the above problems. The object of the invention is achieved by the methods and equipment which are characterized by what is stated in the independent claims. Preferred embodiments of the invention are disclosed in the dependent claims.

The invention is partially based on the discovery of a surprising problem that has been found as a result of extensive market research. Although clients of mobile networks normally trust their mobile operators as regards voice calls, they are surprisingly reluctant to trust the mobile operators as regards data services, such as e-mail service. The reluctance to trust mobile operators in respect of data services makes public-key interchange schemes unattractive.

An aspect of the invention is a method for conveying e-mail traffic between an e-mail server and a mobile terminal, wherein the mobile terminal has an e-mail address under the e-mail server, and permanent terminal identity and a temporary identity in an access network. The method comprises the following steps:

A connectivity function, which acts as a mediator between the e-mail server and the mobile terminal, is operationally coupled to the e-mail server and the access network. The connectivity function is configured to encrypt e-mail traffic to the mobile terminal and decrypt e-mail traffic from the mobile terminal. In order to encrypt and decrypt e-mail traffic, the connectivity function needs encryption information.

The required encryption information is generated at the mobile terminal.

The generated encryption information and an identifier of the mobile terminal are conveyed via a secure channel to the connectivity function, after authenticating the entity that conveys the encryption information or by utilizing an already-performed authentication of the entity.

The encryption information and the identifier of the mobile terminal are combined into a service activation code, which also includes checksum information so as to detect an incorrectly entered service activation code.

In an embodiment of the invention, the secure channel for conveying the encryption information is implemented as follows. The user of the mobile terminal may have a host system, such as an office terminal, which is coupled to the connectivity function via a private network. The private network requires authentication in order to grant access to users. In this embodiment the mobile terminal generates the encryption information and displays it on its display, and the user enters the encryption information to the host system that is coupled to the private network.

Alternatively, the mobile terminal user may have a trust relation with another person, such as a support technician, who is authenticated in the private network. For example, trust relation may be established in a voice call in which the support technician recognizes the voice of the mobile terminal user. The mobile terminal user then dictates the encryption information to the support technician who enters it via a host system coupled to the private network.

Thus the secure channel from the mobile terminal to the connectivity function comprises a short segment over which the encryption information is conveyed off-line to a human user that may be the user of the mobile terminal or someone Who trusts him/her. The off-line segment is a segment that is detached from public networks and is immune against hacking or eavesdropping via public networks. The off-line segment may be implemented visually, such that the mobile terminal displays the encryption information on its display, and the user enters it into a terminal of the private network. Alternatively, the encryption information may be conveyed on a detachable memory or via a short-range microwave connection, an example of which is known as Bluetooth. The secure channel also comprises a segment spanned by the private network. The secure channel may also comprise a segment spanned by a conventional voice call, if the mobile terminal user is distant from a terminal of the private network.

BRIEF DESCRIPTION OF THE DRAWINGS

In the following the invention will be described in greater detail by means of preferred embodiments with reference to the attached drawings, in which FIG. 1 shows an exemplary system architecture in which the invention can be used;

FIG. 2 shows procedure steps for establishing a secure connection.

DETAILED DESCRIPTION OF PREFERRED EMBODIMENTS

The invention is applicable to virtually any mobile e-mail system architecture. FIG. 1 shows an exemplary system architecture which is supported by the owner of the present application. Reference numeral 100 denotes a host system that is able to send an receive e-mail messages. Reference numeral 102 denotes a mobile terminal, also able to send an receive e-mail messages. The e-mail messages may originate or terminate at external e-mail terminals, one of which is denoted by reference numeral 104. The invention aims at improving cooperation between the host system 100 and mobile terminal 102 such that they can use a single e-mail account as transparently as possible. This means, for example, that the users of the external e-mail terminals 104, when sending or receiving e-mail, do not need to know if the user of the host system 100 actually uses the host system 100 or the mobile terminal 102 to communicate via e-mail. The transparency also means that e-mail manipulation at the mobile terminal 102 has, as far as possible, the same effect as the corresponding e-mail manipulation at the host system 100. For example, e-mail messages read at the mobile terminal 102 should preferably be marked as read at the host system.

Reference numeral 106 denotes a data network, such as an IP (Internet Protocol) network, which may be the common Internet or its closed subnetworks, commonly called intranets or extranets. Reference numeral 108 denotes an e-mail server and its associated database. There may be separate e-mail servers and/or server addresses for incoming and outgoing e-mail. The database stores an e-mail account, addressable by means of an e-mail address, that appears as a mailbox to the owner of the e-mail account. In order to communicate with mobile terminals 102, the data network 106 is connected, via a gateway 112 to an access network 114. The access network comprises a set of base stations 116 to provide wireless coverage over a wireless interface 118 to the mobile terminals 102.

Reference numeral 110 denotes a messaging centre that is largely responsible for providing the above-mentioned transparency between the host system 100 and the mobile terminal 102. The system architecture also comprises a connectivity function 120, whose task is to push e-mail messages to the mobile terminal. In the embodiment shown in FIG. 1, the connectivity function 120 is considered a physically integral but logically distinct element of the messaging centre 110.

The mobile terminal 102 may be a pocket or laptop computer with a radio interface, a smart cellular telephone, or the like. Depending on implementation, the host system 100, if present, may have different roles. In some implementations the host system 100 is optional and may be a conventional office computer that merely acts as the mobile terminal user's principal computer and e-mail terminal. In other implementations the host system may act as a platform for a single user's connectivity function, in addition to being an office computer. In yet other implementations the host system 100 may comprise the connectivity function for several users. Thus it is a server instead of a normal office computer.

We assume here that the access network 114 is able to establish and maintain a tunnel 122 between the messaging centre 110 and the mobile terminal 102. For instance, the tunnel may be set up using GPRS Tunnelling Protocol (GTP) or its later derivatives, or any other suitable tunnelling protocol.

FIG. 1 shows an embodiment in which the messaging centre 110 is largely responsible for e-mail transport to/from the mobile terminal 102 via the access network 114, while a separate connectivity function 120 is responsible for data security issues. The connectivity function 120 may be physically attached to or co-located with the messaging centre 110, but they are logically separate elements. Indeed, a definite advantage of the separate connectivity function 120 is that it can be detached from the messaging centre, for instance, within the company that owns the host system 100 or the e-mail server 108. For a small number of users, the connectivity function 120 can be installed in each host system 100, or the host system 100 can be interpreted as a separate server configured to support multiple users. It is even possible to implement some or all the above-mentioned options. This means, for example, that there is one or more messaging centres 110 that offer services to several network operators, or they may be a dedicated messaging centre for each network operator (somewhat analogous to short messaging centres). Each messaging centre 110 may have an integral connectivity function 120 to support users who don't wish to install a separate connectivity function in a host system 100. For users who do install a separate connectivity function 120 in their host systems 100, such connectivity functions bypass the connectivity function in the messaging centre 110 and address the messaging centre 110 directly.

A real e-mail system supports a large number of mobile terminals 102 and tunnels 122. In order to keep track of which e-mail account and which tunnel belongs to which mobile terminal, the messaging centre 110 and the connectivity function collectively maintain an association 124, 124' for each supported mobile terminal. Basically, each association 124, 124' joins three fields, namely an e-mail address 124A assigned to the mobile terminal or its user, encryption information 124C and a temporary wireless identity 124D of the mobile terminal in the access network. The embodiment shown in FIG. 1 also employs a terminal identifier 124B which may be the same as the e-mail address 124A of the mobile terminal 102, in which case the association 124 actually associates three information items. Alternatively, the terminal identifier 124B may be an identifier arbitrarily assigned to the mobile terminal. In a preferred implementation the terminal identifier 124B is the mobile terminal's equipment identifier or its derivative. The encryption information 124C is preferably related to the mobile terminal's equipment identity and is preferably generated by the mobile terminal itself, so as to ensure that no other terminal besides the one used for creating the encryption information 124C will be able to decrypt incoming encrypted e-mail messages. The temporary wireless identity 124D may be the identifier of the tunnel 122 to the mobile station. Of course, the tunnel identifier is not permanent and is only known when a tunnel exists.

FIG. 2 shows a secure e-mail provisioning technique in which the host system 100 authenticates the user of the mobile terminal 102. In step 2-1 the client software in the mobile terminal 102 generates and displays a service activation code. In step 2-2 the host system 100 authenticates the person who enters the service activation code. Instead of a dedicated authentication step, the technique may rely on the authentication of the underlying e-mail system, such as user name and password combination. After all, the e-mail provisioning need not be more secure than the underlying e-mail system. In step 2-3 the service activation code is then conveyed off-line to the host system 100. The idea of the off-line communication is to eliminate any chance of eavesdropping before secure a communication channel can be established. For instance, the service activation code may be entered manually or via a local connection, such as a wired or optical interface or a short-range wireless interface, such as Bluetooth™. Finally, in step 2-4, the mobile terminal's service activation code is registered with the connectivity function 120.

The service activation code is closely related to an encryption key to be used in future communications between the connectivity function 120 and the mobile terminal 102. The service activation code and the encryption key may be identical, or one may be a subset of the other, or the encryption key may be derived from the service activation code by means of some, preferably unpublished, algorithm. The fact that the service activation code and the encryption key are closely related to each other ensures that the terminal used in the authentication process is the terminal used to access the e-mail service afterwards.

Thus the idea of conveying the service activation code to the connectivity function 120 via the host system 100 solves both the security-related and user interface-related problems mentioned above. If there is no host system 100 that can authenticate the mobile terminal and its user. Instead, the user may enter the provisioning data to the connectivity function via some suitable connection. The provisioning data entered by the user may be checked by sending a trial e-mail message and attempting to read it. If the check succeeds, it is regarded as the authentication. Yet another way is to convey the service activation code to a dedicated support person who performs the authentication (eg by recognizing the person's face or voice) and enters the service activation code into the connectivity function 120. The connectivity function 120 now stores an association (item 124 in FIG. 1) between the e-mail address 124A and encryption information 124C.

The mobile terminal preferably generates the service activation code based on the encryption key, the mobile terminal's identifier and a checksum. A benefit of the checksum is that invalid service activation codes can be detected, considering the fact that the service activation code may be conveyed via channels that are immune to electrical eavesdropping but very prone to human errors. For example, the service activation code may be read visually from the mobile terminal's display and entered manually into another terminal.

The mobile terminal's identifier can be its IMEI, IMSI, MSISDN, or other network identifier. A benefit of encoding the mobile terminal's identifier and the encryption key into the service activation key is that the connectivity function 120 needs both to communicate with the mobile terminal. The connectivity function 120 needs the mobile terminal's identifier in order to send data to the mobile terminal. The connectivity function 120 also needs the encryption key because it is the mobile terminal's peer entity as regards encryption. As soon as the connectivity function 120 receives knowledge of the mobile terminal's identifier and the encryption key, it can send the mobile terminal a first message comprising service provisioning settings, after which it can begin sending user traffic, such as new e-mail messages, calendar information and the like.

As stated in the description of FIG. 1, there are several possible implementations for the connectivity function 120. For example, it can be installed in a public data network, such as the Internet, as a physically integral element of the messaging centre 110 but logically distinct from it. It can also be installed in a company's private network within a firewall. It can be installed as a process in each mobile terminal user's office computer, or one common server can support all mobile users of the company, somewhat analogously to a company's e-mail server. The advantages of the invention are easiest to see when the connectivity function is dedicated to a particular company and is located within the company's firewall. This is because in this implementation there are several connectivity functions, and the mobile terminal has no a priori knowledge of which one it should connect to. A coarse solution to this problem is requesting this information from the user, but entering exact configuration information via a small user interface is one of the problems this invention attempts to solve.

It is readily apparent to a person skilled in the art that, as the technology advances, the inventive concept can be implemented in various ways. The invention and its embodiments are not limited to the examples described above but may vary within the scope of the claims.

The invention claimed is:

1. A method for conveying e-mail traffic between an e-mail server and a mobile terminal, the method comprising:
   generating a service activation code at the mobile terminal, wherein the service activation code comprises an identifier of the mobile terminal and encryption information;
   providing the service activation code for authentication of a user of the mobile terminal, wherein the service activation code is provided at the mobile terminal;
   providing the identifier of the mobile terminal and the encryption information to a connectivity application at the e-mail server, wherein execution of the connectivity application at the e-mail server in response to receipt of the identifier and encryption information establishes an encrypted data channel using the provided encryption information; and
   connecting to the established encrypted data channel for conveyance of e-mail traffic, wherein the mobile terminal has an e-mail address under the e-mail server, a permanent terminal identity assigned to the mobile terminal, and a temporary identity in an access network, the temporary identity based on an identifier of the tunnel to the mobile terminal.

2. The method of claim 1, wherein the encryption information is based on an equipment identity of the mobile terminal.

3. The method of claim 1, further comprising displaying the encryption information on a display of the mobile terminal for entry at an authenticating terminal.

4. The method of claim 3, wherein the display of the mobile terminal provides the encryption information to the user for manual entry at the authenticating terminal.

5. The method of claim 1, wherein providing the encryption information comprises conveying the encryption information on a detachable memory.

6. The method of claim 1, wherein authenticating a user of the mobile terminal using the service activation code occurs off-line.

7. The method of claim 1, wherein the service activation code is registered with the connectivity function.

8. The method of claim 1, wherein the service activation code further comprises a checksum for determining validity of the service activation code.

9. The method of claim 1, wherein the connectivity function establishing the encrypted data channel comprises sending service provisioning settings to the mobile terminal.

10. A computer-readable storage medium having embodied thereon a program, the program being executable by a computing device to perform a method for conveying e-mail traffic between an e-mail server and a mobile terminal, the method comprising:
   generating a service activation code at the mobile terminal, wherein the service activation code comprises an identifier of the mobile terminal and encryption information;
   providing the service activation code for authentication of a user of the mobile terminal, wherein the service activation code is provided at the mobile terminal;
   providing the identifier of the mobile terminal and the encryption information to a connectivity application at the e-mail server, wherein execution of the connectivity application at the e-mail server in response to receipt of the identifier and encryption information establishes an encrypted data channel using the provided encryption information; and
   connecting to the established encrypted data channel for conveyance of e-mail traffic, wherein the mobile terminal has an e-mail address under the e-mail server, a permanent terminal identity assigned to the mobile terminal, and a temporary identity in an access network, the temporary identity based on an identifier of the tunnel to the mobile terminal.

\* \* \* \* \*